US012512130B2

(12) United States Patent
Kim

(10) Patent No.: US 12,512,130 B2
(45) Date of Patent: *Dec. 30, 2025

(54) MEMORY DEVICE HAVING SUPPORT STRUCTURE

(71) Applicant: SK hynix Inc., Icheon-si (KR)

(72) Inventor: Jae Ho Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 124 days.

This patent is subject to a terminal disclaimer.

(21) Appl. No.: 18/504,905

(22) Filed: Nov. 8, 2023

(65) Prior Publication Data

US 2024/0420738 A1 Dec. 19, 2024

(30) Foreign Application Priority Data

Jun. 14, 2023 (KR) .......................... 10-2023-0076119

(51) Int. Cl.
*G11C 5/02* (2006.01)
*H10B 43/10* (2023.01)
*H10B 43/27* (2023.01)
*H10B 43/40* (2023.01)

(52) U.S. Cl.
CPC ............. *G11C 5/025* (2013.01); *H10B 43/10* (2023.02); *H10B 43/27* (2023.02); *H10B 43/40* (2023.02)

(58) Field of Classification Search
CPC ........ G11C 5/025; H10B 43/10; H10B 43/27; H10B 43/40; H10B 43/50; H10B 43/20; G11B 33/04
USPC .......................................................... 365/51
See application file for complete search history.

(56) References Cited

U.S. PATENT DOCUMENTS

| 2016/0204123 | A1* | 7/2016 | Yang ..................... | H01L 21/768 257/329 |
| 2023/0084615 | A1* | 3/2023 | Xie ........................ | H01L 23/562 257/314 |
| 2024/0324212 | A1* | 9/2024 | Kitamoto ............... | H10B 43/10 |
| 2024/0357809 | A1* | 10/2024 | Aung ..................... | H10B 43/27 |
| 2024/0377865 | A1* | 11/2024 | Kim ........................ | G06F 1/183 |

FOREIGN PATENT DOCUMENTS

| CN | 115312528 A | * 11/2022 | ....... H01L 21/76816 |
| KR | 100492899 B1 | 6/2005 | |
| KR | 1020200011852 A | 2/2020 | |
| KR | 1020200020332 A | 2/2020 | |
| KR | 1020220059122 A | 5/2022 | |
| WO | WO-2022231674 A1 | * 11/2022 | ......... H01L 23/5226 |

* cited by examiner

*Primary Examiner* — Fernando Hidalgo
(74) *Attorney, Agent, or Firm* — WILLIAM PARK AND ASSOCIATES LTD.

(57) ABSTRACT

A memory device includes: a stack structure; first support structures penetrating the stack structure, the first support structures being spaced apart from each other in a first direction; a first protrusion pattern penetrating the stack structure, the first protrusion pattern being spaced apart from one of the first support structures in a second direction; a first outer support structure penetrating the stack structure, the first outer support structure extending along the first direction from the first protrusion pattern; and a central support structure penetrating the stack structure, the central support structure extending in the second direction in a region between the first support structures, the central support structure being in contact with the first outer support structure.

20 Claims, 14 Drawing Sheets

MEMORY DEVICE HAVING SUPPORT STRUCTURE

CROSS-REFERENCE TO RELATED APPLICATION

The present application claims priority under 35 U.S.C. § 119(a) to Korean patent application number 10-2023-0076119 filed on Jun. 14, 2023, in the Korean Intellectual Property Office, the entire disclosure of which is incorporated by reference herein.

BACKGROUND

1. Technical Field

The present disclosure generally relates to a memory device having a support structure, and more particularly, to a memory device having a support structure located in a connection region.

2. Related Art

A memory device may include a memory cell array in which data is stored, a peripheral circuit configured to perform a program, read, or erase operation on the memory cell array, and a control circuit configured to control the peripheral circuit.

The memory cell array may include a plurality of memory blocks. When the memory blocks are formed in a three-dimensional structure, the memory blocks may be separated from each other by slit regions.

The memory blocks formed in the three-dimensional structure may include a stack structure in which memory cell are stacked in a vertical direction on a substrate. The stack structure may include a plurality of gate lines and a plurality of insulating layers, which are alternately stacked. When the memory blocks are configured with the stack structure, support structures may be used to prevent the stack structure from being bent or destroyed in a manufacturing process of the memory device. For example, the support structures may be located in a cell region or a connection region defined at both ends of the cell region.

As the degree of integration of the memory device increases, the size of support structures included in the cell region and the connection region decreases. Therefore, a bridge may occur in which some support structures are in contact with each other. The bridge occurring between the support structures, which should be electrically blocked from each other, becomes a defect in the memory device, and therefore, the yield of the manufacturing process of the memory device may be deteriorated.

SUMMARY

In accordance with an aspect of the present disclosure, there is provided a memory device including: a stack structure; first support structures penetrating the stack structure, the first support structures being spaced apart from each other in a first direction; a first protrusion pattern penetrating the stack structure, the first protrusion pattern being spaced apart from one of the first support structures in a second direction; a first outer support structure penetrating the stack structure, the first outer support structure extending along the first direction from the first protrusion pattern; and a central support structure penetrating the stack structure, the central support structure extending in the second direction in a region between the first support structures, the central support structure being in contact with the first outer support structure.

In accordance with another aspect of the present disclosure, there is provided a memory device including: a stack structure; first and second outer support structures penetrating the stack structure, the first and second outer support structures extending in parallel to each other in a first direction; a central support structure extending in a second direction, which is perpendicular to the first direction, between the first and second outer support structures; and a protrusion pattern penetrating the stack structure, the protrusion pattern extending along the first direction from the central support structure, wherein the protrusion pattern extends in the opposite direction of a direction in which the first and second outer support structures extend from the central support structure.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural and functional descriptions disclosed herein are merely illustrative for the purpose of describing embodiments according to the concept of the present disclosure. Additional embodiments according to the concept of the present disclosure can be implemented in various forms. Thus, the present disclosure should not be construed as limited to the embodiments set forth herein.

Hereinafter, it will be understood that, although the terms "first," "second," etc. may be used herein to describe various elements, these elements should not be limited by these terms. These terms are only used to distinguish one element from another element.

Embodiments provide a memory device capable of reducing a defect of the memory device.

Figure 1:
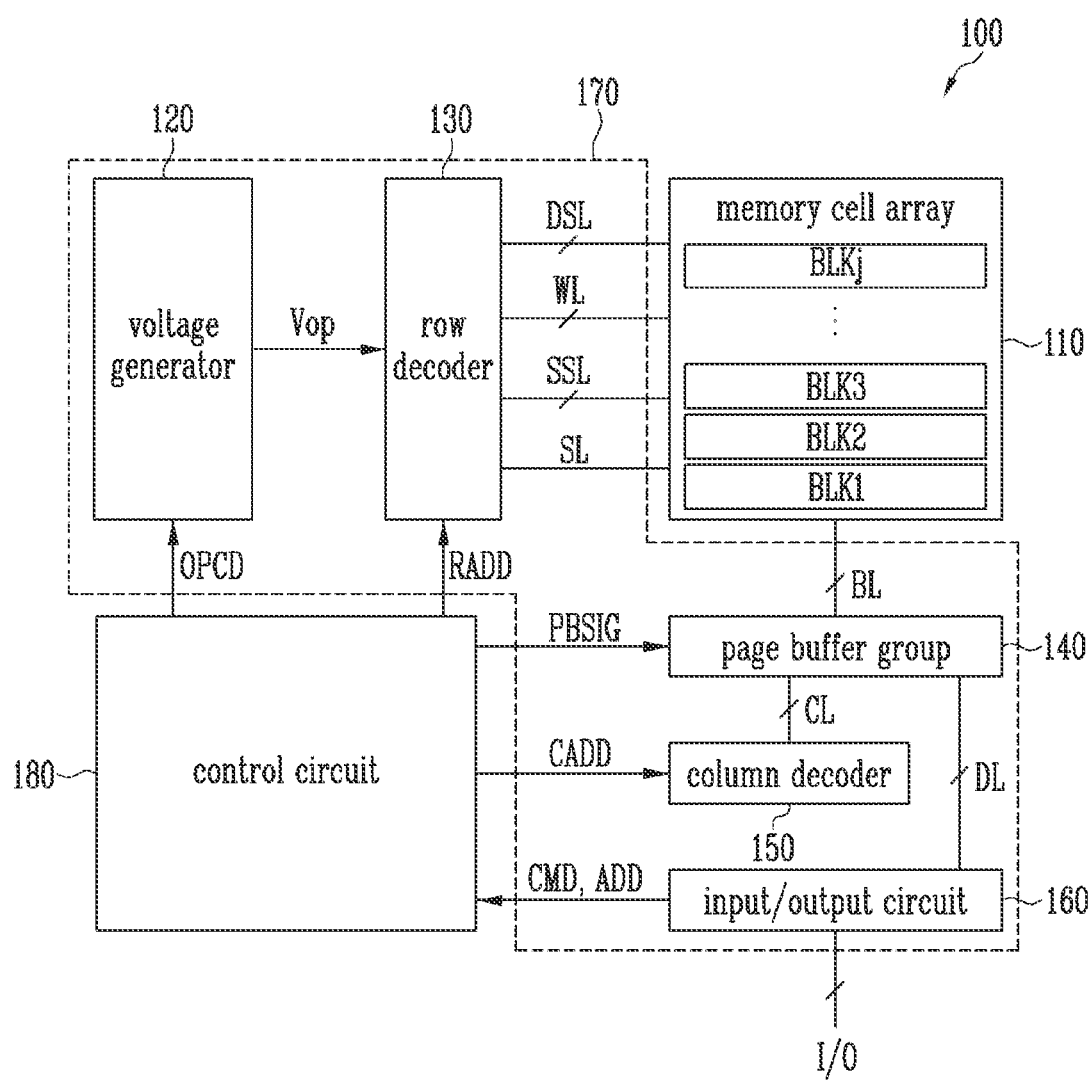
FIG. 1 is a diagram illustrating a memory device.

FIG. 1 is a diagram illustrating a memory device.

Referring to FIG. 1, the memory device 100 may include a memory cell array 110, a peripheral circuit 170, and a control circuit 180.

The memory cell array 110 may include first to jth memory blocks BLK1 to BLKj. Each of the first to jth memory blocks BLK1 to BLKj may include memory cells capable of storing data. Drain select lines DSL, word lines WL, source select lines SSL, and a source line may be connected to each of the first to jth memory blocks BLK1 to BLKj, and bit lines BL may be commonly connected to the first to jth memory blocks BLK1 to BLKj.

The first to jth memory blocks BLK1 to BLKj may be formed in a two-dimensional structure or a three-dimensional structure. Memory blocks having the two-dimensional structure may include memory cells arranged in parallel to a substrate. Memory blocks having the three-dimensional structure may include memory cells stacked in a vertical direction on a substrate. In this embodiment, memory blocks formed in a three-dimensional structure are disclosed.

The memory cells may store one-bit or two-or-more-bit data according to a program manner. For example, a manner in which one-bit data is stored in one memory cell is referred to as a single level cell (SLC) manner, and a manner in which two-bit data is stored in one memory cells is referred to as a multi-level cell (MLC) manner. A manner in which three-bit data is stored in one memory cell is referred to as a triple level cell (TLC) manner, and a manner in which four-bit data is stored in one memory cell is referred to as a quad level cell (QLC) manner. In addition, five-or-more-bit data may be stored in one memory cell.

The peripheral circuit 170 may be configured to perform a program operation for storing data, a read operation for outputting data stored in the memory cell array 110, and an erase operation for erasing data stored in the memory cell array 110. For example, the peripheral circuit 170 may include a voltage generator 120, a row decoder 130, a page buffer group 140, a column decoder 150, and an input/output circuit 160.

The voltage generator 120 may generate various operating voltages Vop used for a program operation, a read operation, or an erase operation in response to an operation code OPCD. For example, the voltage generator 120 may be configured to generate program voltages, turn-on voltages, turn-off voltages, negative voltages, precharge voltages, verify voltages, read voltages, pass voltages, and erase voltages in response to the operation code OPCD. The operating voltages Vop generated by the voltage generator 120 may be applied to drain select lines DSL, word lines WL, source select lines SSL, and a source line SL of a selected memory block through the row decoder 130.

The program voltages may be voltages applied to a selected word line, among word lines WL, in a program operation and may be used to increase a threshold voltage of memory cells connected to the selected word line. The turn-on voltages may be applied to the drain select lines DSL or the source select lines SSL and may be used to turn on drain select transistors or source select transistors. The turn-off voltages may be applied to the drain select lines DSL or the source select lines SSL and may be used to turn off the drain select transistors or the source select transistors. For example, the turn-off voltage may be set to 0V. The precharge voltages may be voltages higher than 0V and may be applied to the bit lines in a read operation. The verify voltages may be used in a verify operation for determining whether a threshold voltage of selected memory cells has been increased to a target level. The verify voltages may be set to various levels according to the target level and may be applied to a selected word line.

The read voltages may be applied to a selected word line in a read operation of selected memory cells. For example, the read voltages may be set to various levels according to a program manner of the selected memory cells. The pass voltages may be voltages applied to unselected word lines, among the word lines WL, in a program or read operation and may be used to turn on memory cells connected to the unselected word lines.

The erase voltages may be used in an erase operation for erasing memory cells included in a selected memory block and may be applied to the source line SL.

The row decoder 130 may be configured to transmit the operating voltages Vop to drain select lines DSL, word lines WL, source select lines SSL, and a source line SL, which are connected to a selected memory block, according to a row address RADD. For example, the row decoder 130 may be connected to the voltage generator 120 through global lines and may be connected to the first to jth memory blocks BLK1 to BLKj through the drain select lines DSL, the word lines WL, the source select lines SSL, and the source line SL.

The page buffer group 140 may include page buffers (not shown) connected to each of the first to jth memory blocks BLK1 to BLKj. The page buffers (not shown) may be connected to the first to jth memory blocks BLK1 to BLKj respectively through the bit lines BL. In a read operation, in response to page buffer control signals PBSIG, the page buffers (not shown) may sense a current or a voltage of the bit lines BL, which varies according to threshold voltages of selected memory cells, and may temporarily store sensed data.

The column decoder 150 may be configured to transmit data between the page buffer group 140 and the input/output circuit 160 in response to a column address CADD. For example, the column decoder 150 may be connected to the page buffer group 140 through column lines CL and may transmit enable signals through the column lines. The page buffers (not shown) included in the page buffer group 140 may receive or output data through data lines DL in response to the enable signals.

The input/output circuit 160 may be configured to receive or output a command CMD, an address ADD, or data through input/output lines I/O. For example, the input/output circuit 160 may transmit, to the control circuit 180, a command CMD and an address ADD, which are received from an external controller, through the input/output lines I/O, and transmit data received from the external controller to the page buffer group 140 through the input/output lines I/O. Alternatively, the input/output circuit 160 may output data transferred from the page buffer group 140 to the external controller through the input/output lines I/O.

The control circuit 180 may output an operation code OPCD, the row address RADD, the page buffer control signals PBSIG, and the column address CADD in response to the command CMD and the address ADD. For example, when the command CMD input to the control circuit 180 is a command corresponding to a program operation, the control circuit 180 may control the peripheral circuit 170 to perform a program operation on a memory block selected by the address ADD. When the command CMD input to the control circuit 180 is a command corresponding to a read operation, the control circuit 180 may control the peripheral circuit 170 to perform the read operation on the selected memory block and output read data. When the command CMD input to the control circuit 180 is a command corresponding to an erase operation, the control circuit 180 may control the peripheral circuit 170 to perform the erase operation on the selected memory block.

Figure 2:
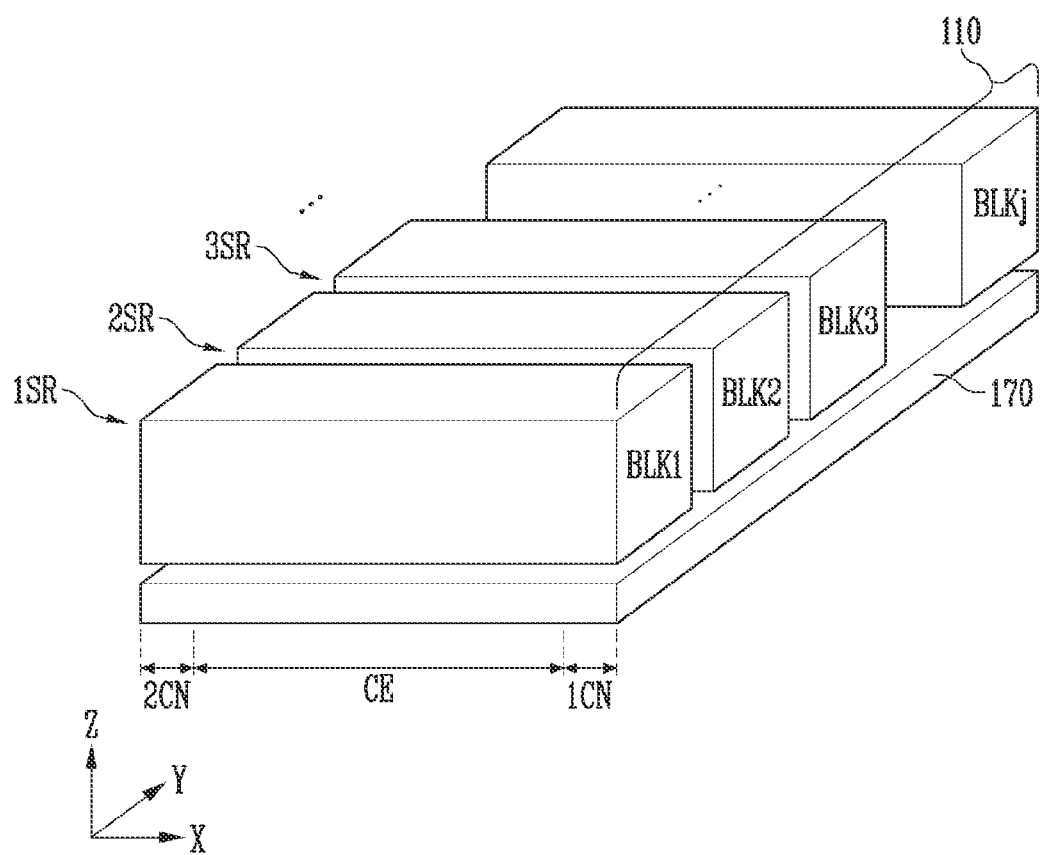
FIG. 2 is a diagram illustrating a memory cell array.

FIG. 2 is a diagram illustrating a memory cell array.

Referring to FIG. 2, the memory cell array 110 may be located on the peripheral circuit 170, but the positions of the memory cell array 110 and the peripheral circuit 170 are not limited to those shown in FIG. 2. For example, the memory cell array 110 may be located on the same plane as the peripheral circuit 170, and the memory cell array 110 and the peripheral circuit 170 may be in contact with each other after the memory cell array 110 and the peripheral circuit 170 are formed on different substrates.

The memory cell array 110 may include first to jth memory blocks BLK1 to BLKj. The first to jth memory blocks BLK1 to BLKj may be disposed to be spaced apart from each other along a Y direction. The first to jth memory blocks BLK1 to BLKj may be configured identically to one another and may be separated from each other by slit regions 1SR, 2SR, 3SR, . . . . Each of the slit regions 1SR, 2SR, 3SR, . . . may extend along an X direction. For example, the first memory block BLK1 may be located between a first slit region 1SR and a second slit region 2SR, and the second memory block BLK2 may be located between the second slit region 2SR and a third slit region 3SR. The first and second memory blocks BLK1 and BLK2 may be separated from each other by the second slit region 2SR.

The first to jth memory blocks BLK1 to BLKj may include a cell region CE and first and second connection regions 1CN and 2CN. The cell region CE may be located between the first and second connection regions 1CN and 2CN. Memory cells may be included in the cell region CE, and contacts and support structures may be included in the first and second connection regions 1CN and 2CN. The memory cells may be configured to store data, the contacts may be configured to be in contact with gate lines extending from the cell region CE or may be in contact with the peripheral circuit 170 located under the memory blocks, and the support structures may be configured to support a stack structure located in the first and second connection regions 1CN and 2CN.

Figure 3A:
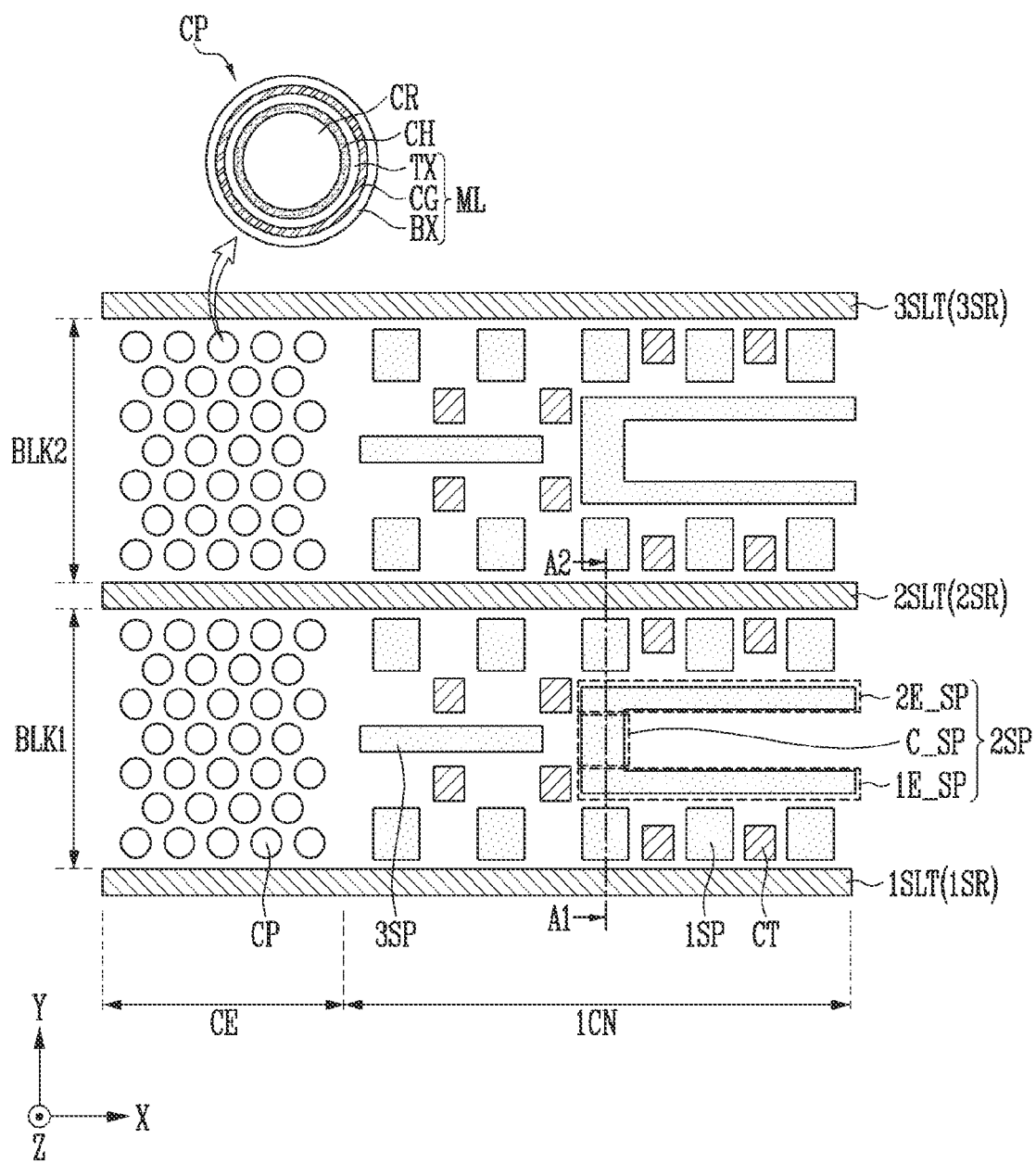
FIG. 3A is a view illustrating a structure of the memory device.

FIG. 3A is a view illustrating a structure of the memory device.

Referring to FIG. 3A, a layout of the first and second memory blocks BLK1 and BLK2, among the first to jth memory blocks BLK1 to BLKj, shown in FIG. 2, is illustrated.

The first and second memory blocks BLK1 and BLK2 may be located between first to third slits 1SLT to 3SLT. The first to third slits 1SLT to 3SLT may be structures formed in first to third slit regions 1SR to 3SR, and the first to third slits 1SLT to 3SLT may be formed of an insulating material or a conductive material or may be formed of the insulating material and the conductive material.

Each of the first and second memory blocks BLK1 and BLK2 may be divided into a cell region CE and a first connection region 1CN. Cell plugs CP including memory cells may be included in the cell region CE, and first support structures 1SP and second support structures 2SP, which are used to support the memory blocks and contacts that are electrically in contact with gate lines extending from the cell region CE or are electrically in contact with the peripheral circuit located under the memory blocks, may be included in the first connection region 1CN.

Memory cells and select transistors may be included in each of the cell plugs CP. For example, a cell plug CP corresponding to the memory cells and the select transistors may include a core pillar CR, a channel layer CH, and a memory layer ML. The memory layer ML may include a tunnel insulating layer TX, a charge trap layer CG, and a blocking layer BX. The core pillar CR may have a circular pillar shape and may be formed of an insulating material or a conductive material. The channel layer CH may have a cylindrical shape surrounding a side surface of the core pillar CR and may be formed of poly-silicon. The tunnel insulating layer TX may have a cylindrical shape surrounding a side surface of the channel layer CH and may be formed of an oxide layer. The charge trap layer CG may have a cylindrical shape surrounding a side surface of the tunnel insulating layer TX and may be formed of a nitride layer. The blocking layer BX may have a cylindrical shape surrounding a side surface of the charge trap layer CG and may be formed of an oxide layer.

The first support structures 1SP located in the first connection region 1CN may be spaced apart from each other along the X direction in a region adjacent to the first to third slits 1SLT to 3SLT. The first support structures may be adjacent to the first to third slits 1SLT to 3SLT but might not be in contact with the first to third slits 1SLT to 3SLT. The first support structures 1SP may penetrate a stack structure forming the memory blocks and may be formed of an insulating material. For example, first support structures 1SP included in the first memory block BLK1 may include support structures adjacent to the first slit 1SLT and support structures adjacent to the second slit 2SLT.

The contacts CT may be located between the first support structures 1SP and may be formed of a conductive material. A length of a major axis of each of the contacts CT may be shorter than a length of a major axis of each of the first support structures 1SP, and a length of a minor axis of each of the contacts CT may be shorter than a length of a minor axis of each of the first support structures 1SP.

The second support structures 2SP may be located between the first support structures 1SP which are spaced apart from each other along the Y direction and between the contacts CT, which are spaced apart from each other along the Y direction. Since the second support structures 2SP perform a function of separating the stack structure, the second support structures 2SP may include first and second outer support structures 1E_SP and 2E_SP that extend in the X direction and may be parallel to each other and a central support structure C_SP that extend along the Y direction. A second support structure 2SP included in the first memory block BLK1 will be described as an example. The second support structure 2SP may include first and second outer support structures 1E_SP and 2E_SP arranged in parallel to each other along the X direction and a central support structure C_SP extending along the Y direction to connect an end of the first outer support structure 1E_SP to an end of the second outer support structure 2E_SP. The first and second outer support structures 1E_SP and 2E_SP and the central support structure C_SP may be formed of an insulating material penetrating the stack structure. Insulating layers and sacrificial layers may be stacked in a stack structure surrounded by the second support structure 2SP, and insulating layers and gate lines may be stacked in a stack structure located outside of the second support structure 2SP.

A third support structure 3SP for supporting the stack structure may be further included in a region surrounded by the first support structures 1SP, the second support structure 2SP, and the cell region CE. The third support structure 3SP may have a line shape extending along the X direction and be formed of an insulating material.

As shown in FIG. 3A, the portions of the first and second outer support structures 1E_SP and 2E_SP that contact the central support structure C_SP may form right angles. In addition, since an area of the central support structure C_SP is greater than an area of each of the first support structures 1SP adjacent to the central support structure C_SP, bowing due to over-etching may occur at both ends of a trench in which the central support structure C_SP is to be formed during an etching process of forming the trench in a region in which the second support structure 2SP is to be formed.

Bowing that may occur in the trench in which the central support structure C_SP is to be formed will be described in detail as follows.

Figure 3B:
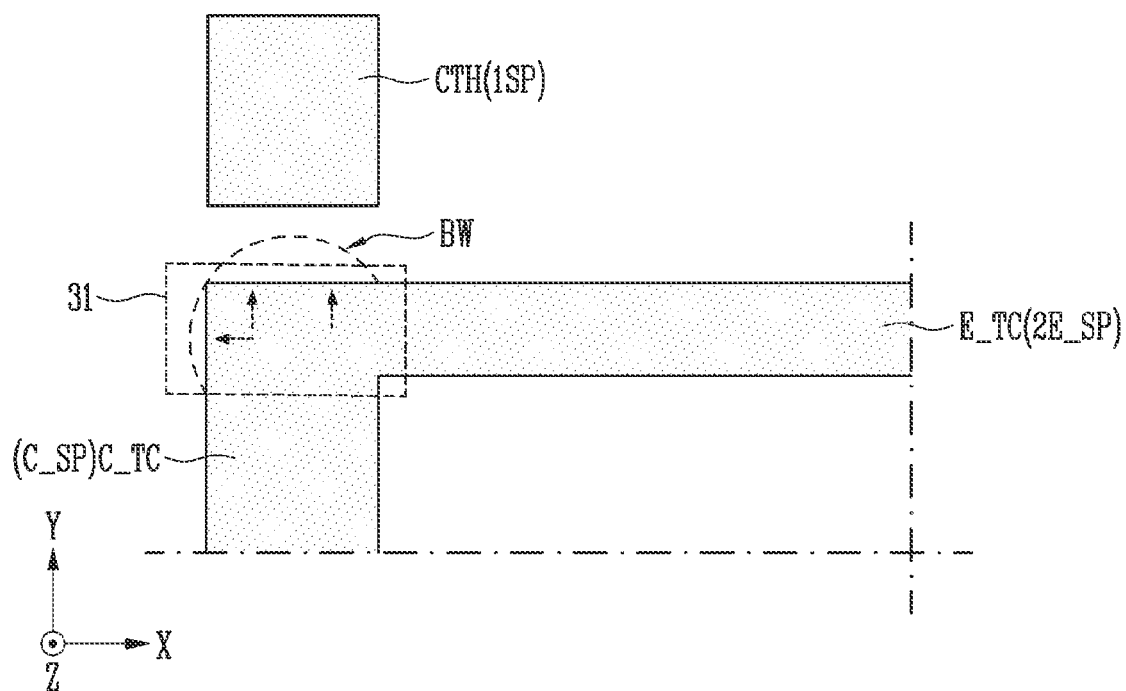
FIG. 3B is a view illustrating a phenomenon in which bowing occurs in a support structure.
Figure 3C:
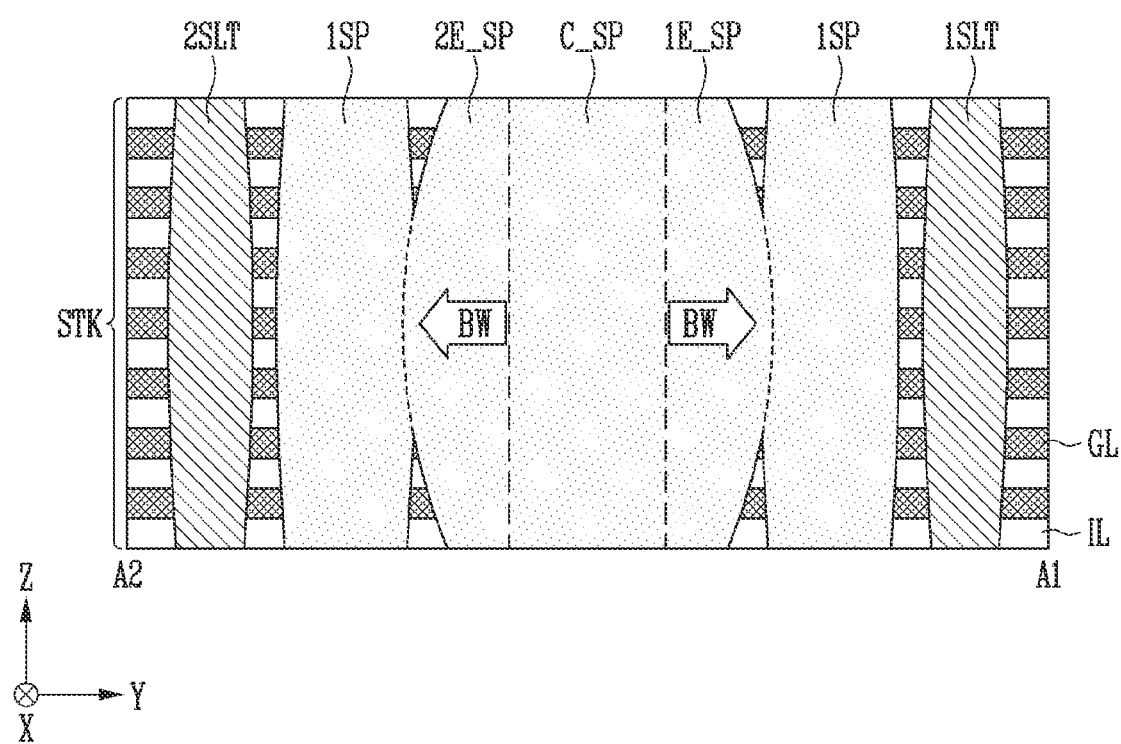
FIG. 3C is a view illustrating a defect due to bowing occurring in the support structure.

FIG. 3B is a view illustrating a phenomenon in which bowing occurs in a support structure. FIG. 3C is a view illustrating a defect due to bowing occurring in the support structure.

Referring to FIGS. 3B and 3C, in an etching process for forming an outer trench E_TC in which the second outer support structure 2E_SP is to be formed and a central trench C_TC in which the central support structure C_SP is to be formed, over-etching may occur in a region in which the outer trench E_TC and the central trench C_TC are in contact with each other, and therefore, bowing BW may occur. For example, the outer trench E_TC and the central trench C_TC may be formed by performing an anisotropic dry etching process.

The anisotropic dry etching process may be performed by using the following principle.

The anisotropic dry etching process may be performed by using a Reactive Ion Etching (RIE) method or a method obtained by applying the RIE method. Plasma may be used in the etching process by using the RIE method or the method obtained by applying the RIE method. Positive ions generated by the plasma may move in a direction perpendicular to a substrate and then may collide with an etching target layer, and therefore, the binding force of a surface of the etching target layer may become weak. Molecules at a portion at which the binding force becomes weak in the etching target layer may be discharged together with radicals. As such, since the positive ions are moved in the direction perpendicular to the etching target layer, an etch rate of a surface parallel to the substrate is higher than an etch rate of a surface perpendicular to the substrate. For this reason, the outer trench E_TC and the central trench C_TC may be formed in the direction perpendicular to the substrate.

However, the direction in which the positive ions are moved may be changed as the depth of the outer trench E_TC and the central trench C_TC becomes deeper. For example, an area of a portion 31 at which the outer trench E_TC and the central trench C_TC are in contact with each other is greater than an area of another region of the outer trench E_TC and the central trench C_TC, and therefore, isotropic etching may be performed in a region having an area greater than the area of the another region. A portion of side surfaces of the outer trench E_TC and the central trench C_TC may be over-etched at the portion 31 at which the outer trench E_TC and the central trench C_TC vertically are in contact with each other, and a shape in which a side surface becomes convex due to the over-etching may be referred to as bowing BW. Therefore, due to bowing BW, a side surface of the portion 31 at which the outer trench E_TC and the central trench C_TC are in contact with each other may become close to a side surface of a contact hole CTH in which the first support structure 1SP is to be formed. When over-etching occurs, a portion of the outer trench E_TC and the central trench C_TC and a side surface of the contact hole CTH may be in contact with each other.

For example, when bowing BW occurs in an etching process for forming the outer trench E_TC, the central trench C_TC, and the contact hole CTH in a stack structure STK in which insulating layers IL and gate lines GL are alternately stacked, the central trench C_TC and a portion of the contact hole CTH may be in contact with each other. When the central support structure C_SP and the first support structure 1SP, formed as an insulating material, are filled in the central trench C_TC and the contact hole CTH after the etching process, some of the gate lines GL that are to extend between the central support structure C_SP and the first support structure 1SP may be cut, which may result in a defect of the memory device.

Accordingly, a layout capable of suppressing an occurrence of bowing BW between the first support structure 1SP and the central support structure C_SP is disclosed in the following embodiment.

Figure 4A:
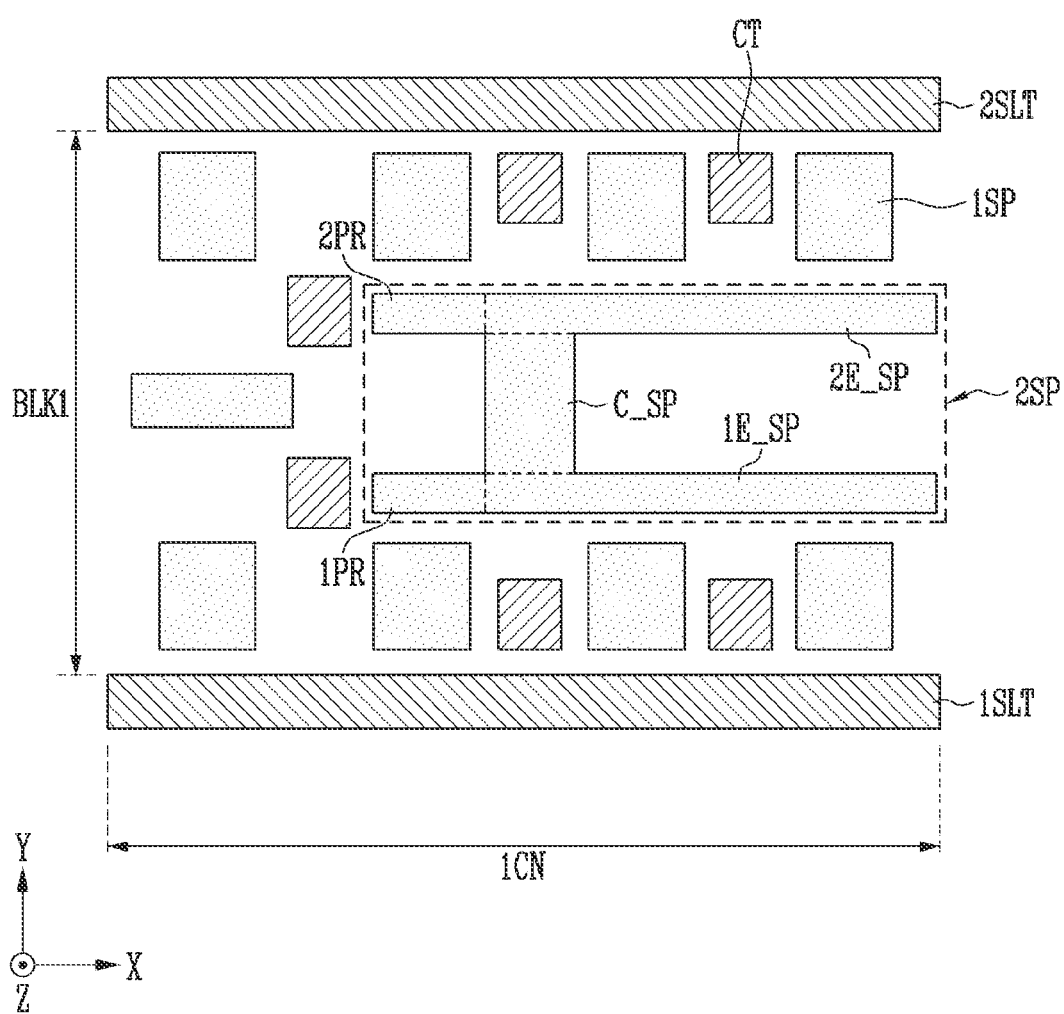
FIG. 4A is a layout of a support structure in accordance with a first embodiment of the present disclosure.
Figure 4B:
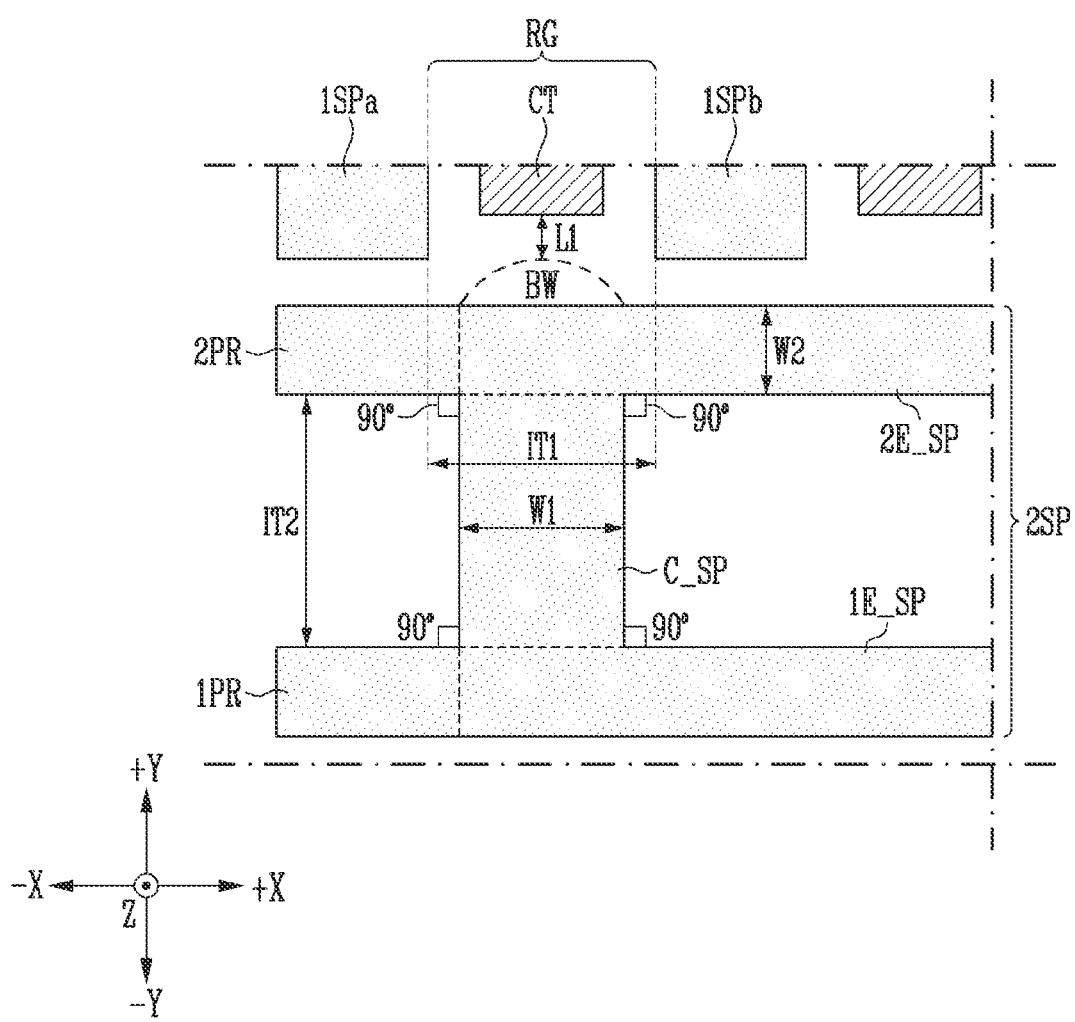
FIG. 4B is a view illustrating a layout of a second support structure and first support structures adjacent to the second support structure in accordance with the first embodiment of the present disclosure.
Figure 4C:
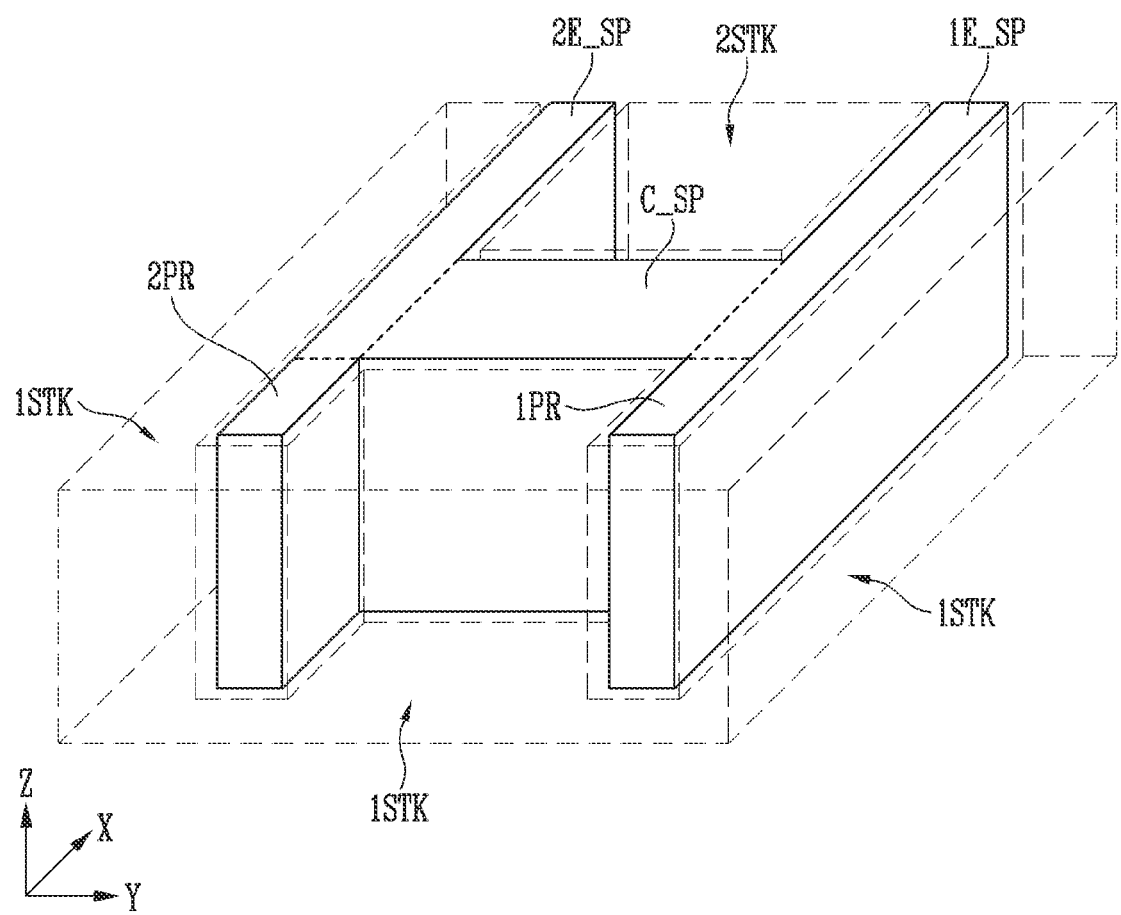
FIG. 4C is a perspective view illustrating the support structure in accordance with the first embodiment of the present disclosure.

FIG. 4A is a layout of a support structure in accordance with a first embodiment of the present disclosure. FIG. 4B is a view illustrating a layout of a second support structure and first support structures adjacent to the second support structure in accordance with the first embodiment of the present disclosure. FIG. 4C is a perspective view illustrating the support structure in accordance with the first embodiment of the present disclosure.

Referring to FIG. 4A, the second support structure 2SP may include first and second outer support structures 1E_SP and 2E_SP, first and second protrusion patterns 1PR and 2PR, and a central support structure C_SP.

The first and second outer support structures 1E_SP and 2E_SP may extend along the X direction and may be arranged to be parallel to each other. The first and second protrusion patterns 1PR and 2PR may be in contact with the first and second outer support structures 1E_SP and 2E_SP, respectively, and may be arranged to be parallel to each other. For example, the first protrusion pattern 1PR may extend from the first outer support structure 1E_SP along the X direction, and the second protrusion pattern 2PR may extend from the second outer support structure 2E_SP along the X direction.

The central support structure C_SP may be located between the first and second outer support structures 1E_SP and 2E_SP in the Y direction. For example, one side surface of the central support structure C_SP and one side surface of each of the first and second outer support structures 1E_SP and 2E_SP may extend together along the Y direction. The first and second protrusion patterns 1PR and 2PR may protrude along the X direction as an extension of the first and second outer support structures 1E_SP and 2E_SP, respectively. For example, when assuming that the first and second outer support structures 1E_SP and 2E_SP extend along the +X direction from the portions at which the central support structure C_SP and the first and second outer support structures 1E_SP and 2E_SP are in contact with each other, the first and second protrusion patterns 1PR and 2PR may extend from the portions along a −X direction. That is, the first and second protrusion patterns 1PR and 2PR may protrude in the opposite direction of the direction in which the first and second outer support structures 1E_SP and 2E_SP extend.

Referring to FIG. 4B, first support structures 1SPa and 1SPb (1SP shown in FIG. 4A) and contacts CT may be disposed at the periphery of the second support structure 2SP. When bowing BW occurs at a portion at which the second outer support structure 2E_SP and the central support structure C_SP are in contact with each other as described with reference to FIG. 3B, the central support structure C_SP may be located in a region RG, which corresponds to a portion in the X direction between the first support structures 1SPa and 1SPb in the X direction to prevent bowing BW from being in contact with the first support structures 1SPa and 1SPb. The contact CT, in addition to the central support structure C_SP, may be located in the region RG between the first support structures 1SPa and 1SPb, the contact CT being aligned with and spaced apart from the central support structure C_SP in the Y direction.

A size of the contacts CT may be smaller than a size of the first support structures 1SP, and the contacts CT may be farther from the second support structure 2SP than the first support structures 1SP are. Thus, although bowing BW occurs at the portion at which the second outer support structure 2E_SP and the central support structure C_SP are in contact with each other, it may be difficult for bowing BW and the contact CT or the first support structures 1SPa and 1SPb to be in contact with each other. Specifically, a first length L1 may be a length extending along a +Y direction and may be a shortest length between bowing BW and the contact CT. However, since the contact CT is farther from the second outer support structure 2E_SP and the second protrusion pattern 2PR than the first support structures 1SPa and 1SPb in the +Y direction, it is difficult for bowing BW to be in contact with the contact CT even when bowing BW occurs. In addition, since bowing BW and the first support structures 1SPa and 1SPb are adjacent to each other in a diagonal direction (either a combination of the +Y direction and a +X direction or a combination of the +Y direction and a −X direction), a phenomenon can be prevented in which bowing BW and the first support structures 1SPa and 1SPb are in contact with each other even when bowing occurs.

Since the central support structure C_SP is located in the region RG corresponding to between the first support structures 1SP, a supporting force of the stack structure in a region corresponding to the −X direction from the portion at which the central support structure C_SP and the second outer support structure 2E_SP are in contact with each other may be decreased. Accordingly, the second protrusion pattern 2PR may extend in the −X direction from the second outer support structure 2E_SP so that a supporting force in a region in which the supporting force may be decreased due to a position change of the central support structure C_SP can be supplemented. Since the second protrusion pattern 2PR extends in a line shape along the ±X direction and has no support structure in contact therewith along the +Y direction or the −Y direction, no bowing BW may occur. Although bowing BW occurs from the second protrusion pattern 2PR in the +Y direction, a size of bowing BW may be smaller than a size of bowing BW occurring in a region in which the central support structure C_SP and the second outer support structure 2E_SP are in contact with each other. Therefore, it would be difficult for the first support structure 1SPa and the second protrusion pattern 2PR to be in contact with each other due to bowing BW.

The central support structure C_SP may have a line shape extending along ±Y direction, the second outer support structure 2E_SP may have a line shape extending along the ±X direction orthogonal to the ±Y direction, and the second protrusion pattern 2PR may have a line shape extending along the −X direction, which is the opposite direction of the ±X direction. Therefore, the central support structure C_SP and the second protrusion pattern 2PR may be in vertical contact with each other, and the central support structure C_SP and the second outer support structure 2E_SP may also be in vertical contact with each other.

When assuming that a width of the central support structure C_SP is a first width W1, the second outer support structure 2E_SP may have a second width W2 that is narrower than the first width W1. For example, the first width W1 may be a length in the ±X direction in the central support structure C_SP, and the second width W2 may be a length in ±Y direction in the second outer support structure 2E_SP. In order to secure a margin between bowing BW and the first support structures 1SPa and 1SPb, the first width W1 may be set to be narrower than a first distance IT1, which is a distance between the first support structures 1SPa and 1SPb in the ±X direction.

The first outer support structure 1E_SP, which is parallel to the second outer support structure 2E_SP and is in contact with the central support structure C_SP, may also be in vertical contact with the central support structure C_SP. The first protrusion pattern 1PR may extend along the −X direction from the first outer support structure 1E_SP and may be arranged in parallel to the second protrusion pattern 2PR. Therefore, the first protrusion pattern 1PR and the central support structure C_SP may be in vertical contact with each other. A length of the first protrusion pattern 1PR in the +X direction may be equal to a length of the second protrusion pattern 2PR in the +X direction. A second distance IT2 between the first and second protrusion patterns 1PR and 2PR in the ±Y direction may be equal to a length of a major axis of the central support structure C_SP.

Referring to FIG. 4C, the first and second outer support structures 1E_SP and 2E_SP, the central support structure C_SP, and the first and second protrusion patterns 1PR and 2PR may support first and second stack structures 1STK and 2STK while penetrating the first or second stack structure 1STK or 2STK. For example, the first stack structure 1STK surrounding the first and second outer support structures 1E_SP and 2E_SP, the central support structure C_SP, and the first and second protrusion patterns 1PR and 2PR may include insulating layers and gate lines, which are alternately stacked. The second stack structure 2STK surrounded by the first and second outer support structures 1E_SP and 2E_SP and the central support structure C_SP may include insulating layers and sacrificial layers, which are alternately stacked.

The insulating layers included in the first and second stack structures 1STK and 2STK may be formed of an oxide layer. The gate lines included in the first stack structure 1STK may be formed of a conductive layer. For example, the gate lines may be formed of a metal material, such as tungsten (W), molybdenum (Mo), cobalt (Co) or nickel (Ni), or a semiconductor material, such as silicon (Si) or poly-silicon (poly-Si). The first and second outer support structures 1E_SP and 2E_SP and the central support structure C_SP may separate the first and second stack structures 1STK and 2STK from each other and may support the first and second stack structures 1STK and 2STK. The first and second protrusion patterns 1PR and 2PR may support the first stack structure 1STK.

Figure 5:
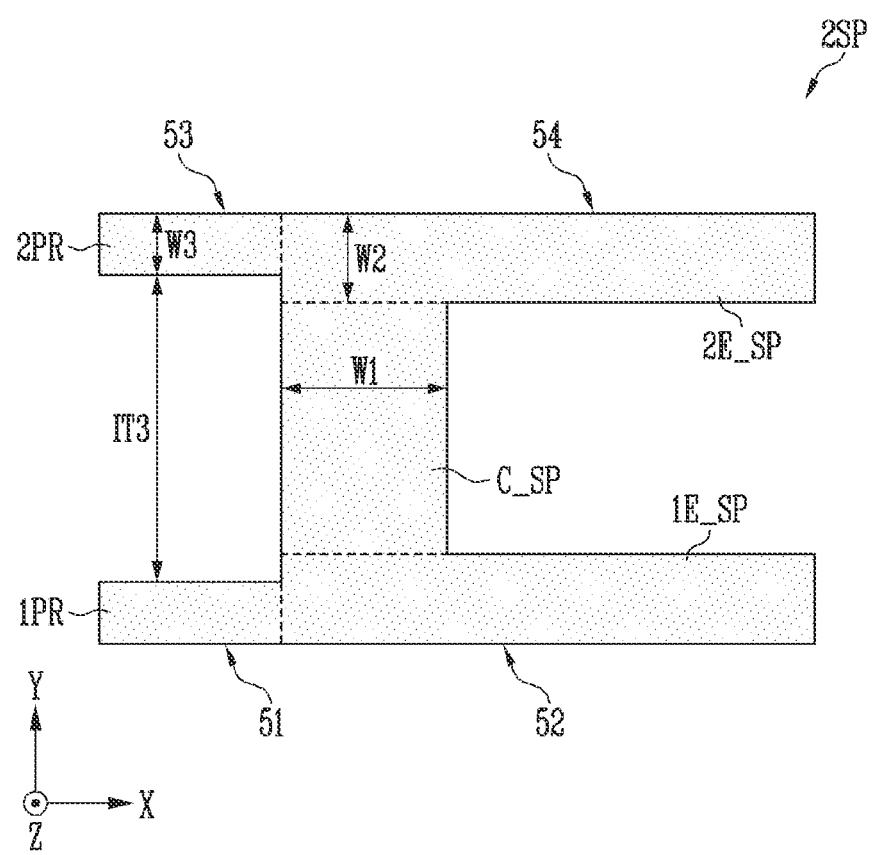
FIG. 5 is a view illustrating a support structure in accordance with a second embodiment of the present disclosure.

FIG. 5 is a view illustrating a support structure in accordance with a second embodiment of the present disclosure.

Referring to FIG. 5, the second support structure 2SP may include first and second outer support structures 1E_SP and 2E_SP, a central support structure C_SP, and first and second protrusion patterns 1PR and 2PR. Each of the first and second protrusion patterns 1PR and 2PR of the second support structure 2SP may have a narrower width than a width of each of the first and second outer support structures 1E_SP and 2E_SP. For example, when assuming that the central support structure C_SP has a first width W1, each of the first and second outer support structures 1E_SP and 2E_SP may have a second width W2, which is narrower than the first width W1, and each of the first and second protrusion patterns 1PR and 2PR may have a third width W3, which is narrower than the second width W2. When a lower surface 51 of the first protrusion pattern 1PR and a lower surface 52 of the first outer support structure 1E_SP extend along the same line, and an upper surface 53 of the second protrusion pattern 2PR and an upper surface 54 of the second outer support structure 2E_SP extend along the same line, a distance between the first and second protrusion patterns 1PR and 2PR may have a third distance IT3, which is longer than a length of a major axis of the central support structure C_SP.

Figure 6:
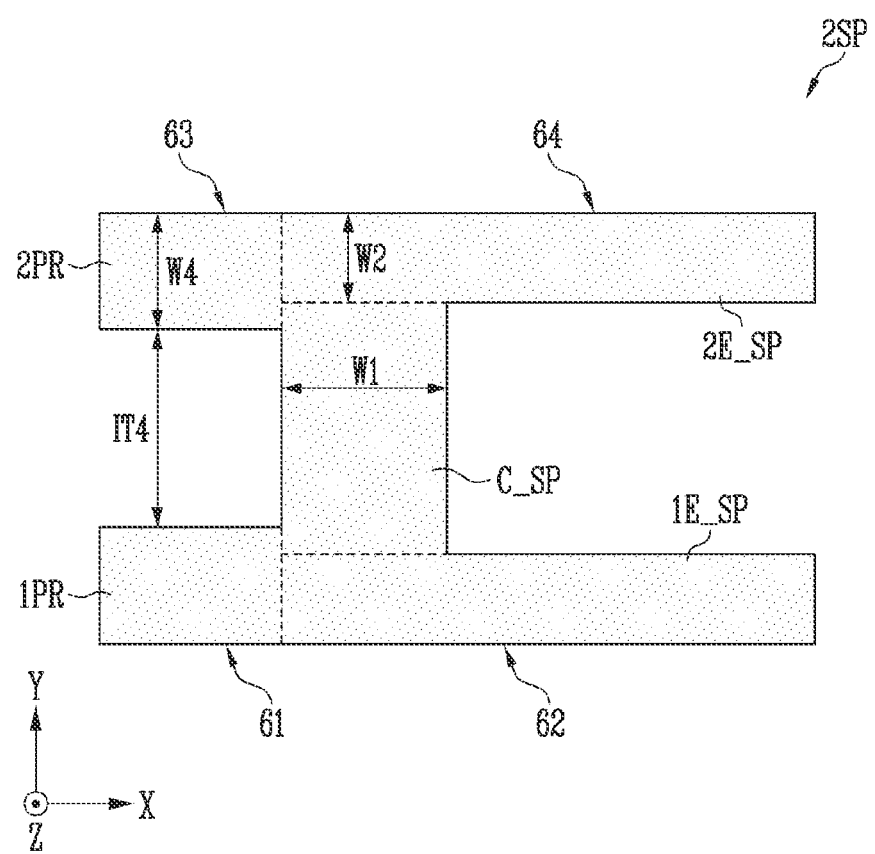
FIG. 6 is a view illustrating a support structure in accordance with a third embodiment of the present disclosure.

FIG. 6 is a view illustrating a support structure in accordance with a third embodiment of the present disclosure.

Referring to FIG. 6, the second support structure 2SP may include first and second outer support structures 1E_SP and 2E_SP, a central support structure C_SP, and first and second protrusion patterns 1PR and 2PR. Each of the first and second protrusion patterns 1PR and 2PR of the second support structure 2SP may have a wider width than a width of each of the first and second outer support structures 1E_SP and 2E_SP. For example, when assuming that the central support structure C_SP has a first width W1, each of the first and second outer support structures 1E_SP and 2E_SP may have a second width W2, which is narrower than the first width W1, and each of the first and second protrusion patterns 1PR and 2PR may have a fourth width W4, which is wider than the second width W2. When a lower surface 61 of the first protrusion pattern 1PR and a lower surface 62 of the first outer support structure 1E_SP extend along the same line, and an upper surface 63 of the second protrusion pattern 2PR and an upper surface 64 of the second outer support structure 2E_SP extend along the same line, a distance between the first and second protrusion patterns 1PR and 2PR may have a fourth distance IT4, which is shorter than a length of a major axis of the central support structure C_SP.

Figure 7:
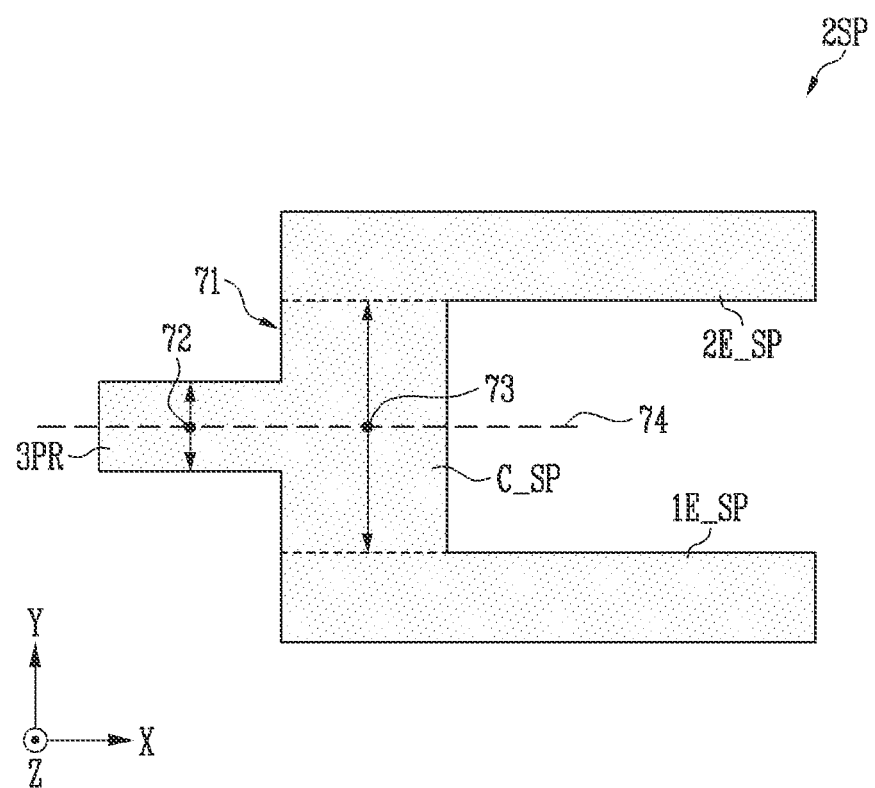
FIG. 7 is a view illustrating a support structure in accordance with a fourth embodiment of the present disclosure.

FIG. 7 is a view illustrating a support structure in accordance with a fourth embodiment of the present disclosure.

Referring to FIG. 7, the second support structure 2SP may include first and second outer support structures 1E_SP and 2E_SP, a central support structure C_SP, and a third protrusion pattern 3PR. The third protrusion pattern 3PR of the second support structure 2SP may be in contact with one surface 71 of the central support structure C_SP. For example, the third protrusion pattern 3PR might not be in contact with the first or second outer support structure 1E_SP or 2E_SP but may be in contact with the one surface 71 of the central support structure C_SP. For example, a central point 72 in the Y direction in the third protrusion pattern 3PR and a central point 73 in the Y direction in the central support structure C_SP may be located on the same line 74 extending along the X direction. A width of the third protrusion pattern 3PR may be narrower than, equal to, or wider than a width of the first or second outer support structure 1E_SP or 2E_SP. When the width of the third protrusion pattern 3PR is wider than the width of the first or second outer support structure 1E_SP or 2E_SP, a width of the third protrusion pattern 3PR in the Y direction may be narrower than a length of a major axis of the central support structure C_SP.

Figure 8:
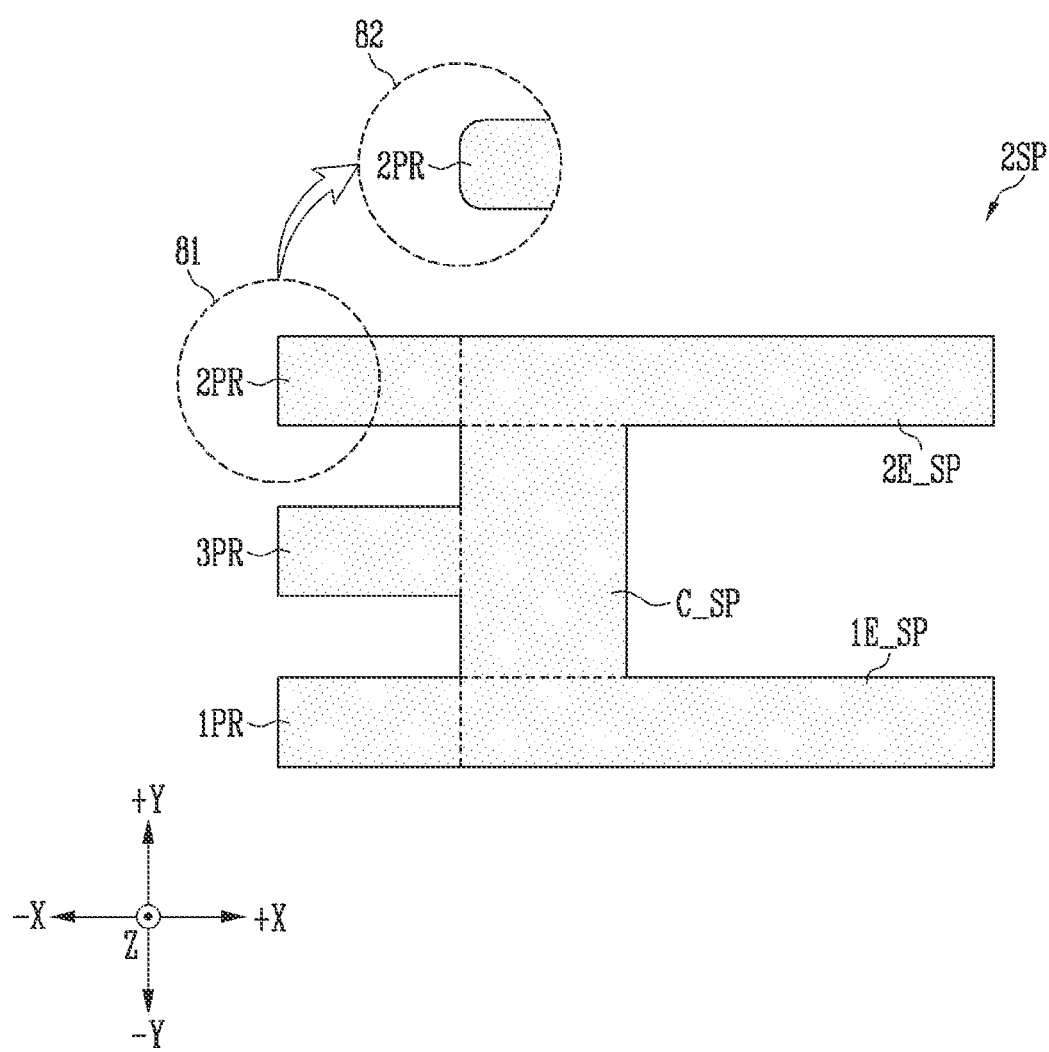
FIG. 8 is a view illustrating a support structure in accordance with a fifth embodiment of the present disclosure.

FIG. 8 is a view illustrating a support structure in accordance with a fifth embodiment of the present disclosure.

Referring to FIG. 8, the second support structure 2SP may include first and second outer support structures 1E_SP and 2E_SP, a central support structure C_SP, and first to third protrusion patterns 1PR to 3PR. In the first to third protrusion patterns 1PR to 3PR of the second support structure 2SP, the first and second protrusion pattern 1PR and 2PR may be respectively in contact with the first and second outer support structures 1E_SP and 2E_SP, and the third protrusion patterns 3PR may be in contact with the central support structure C_SP. For example, the first protrusion pattern 1PR may protrude along the –X direction from the first outer support structure 1E_SP, the second protrusion pattern 2PR may protrude along the –X direction from the second outer support structure 2E_SP, and the third protrusion pattern 3PR may protrude along the –X direction from the central support structure C_SP. A width of each of the first and second protrusion patterns 1PR and 2PR may be equal to, wider than, or narrower than a width of the first or second outer support structure 1E_SP or 2E_SP. A width of the third protrusion pattern 3PR may be narrower than a length of a major axis of the central support structure C_SP. The first to third protrusion patterns 1PR to 3PR may be spaced apart from each other.

In FIG. 8, three protrusion patterns 1PR, 2PR, and 3PR have been illustrated. In some embodiments, the second support structure 2SP may include four or more protrusion patterns in contact with the first and second outer support structures 1E_SP and 2E_SP and the central support structure C_SP along the –X direction. A corner of each of the protrusion patterns 1PR to 3PR may have a right-angled shape 81 or a curved shape 82.

Figure 9:
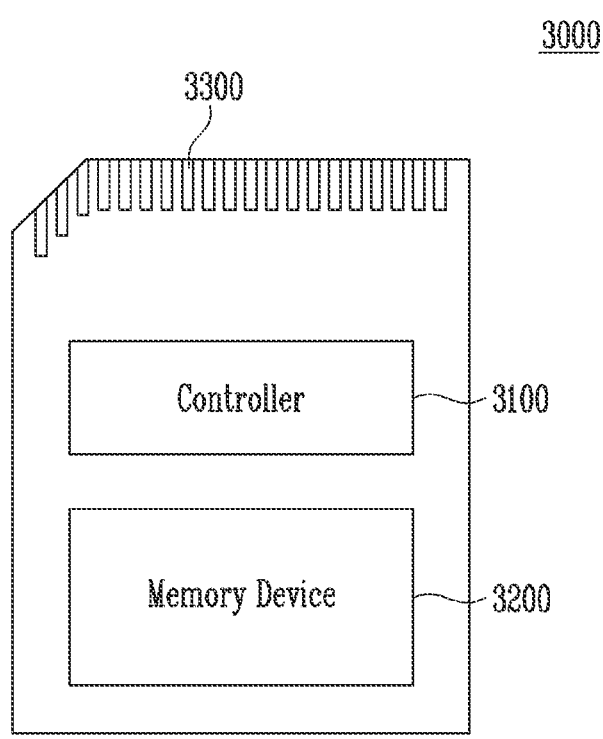
FIG. 9 is a diagram illustrating a memory card system to which the memory device of the present disclosure is applied.

FIG. 9 is a diagram illustrating a memory card system to which the memory device of the present disclosure is applied.

Referring to FIG. 9, the memory card system 3000 may include a controller 3100, a memory device 3200, and a connector 3300.

The controller 3100 may be connected to the memory device 3200. The controller 3100 may access the memory device 3200. For example, the controller 3100 may control a program, read, or ease operation or may control a background operation of the memory device 3200. The controller 3100 may provide an interface between the memory device 3200 and a host. The controller 3100 may drive firmware for controlling the memory device 3200. For example, the controller 3100 may include components, such as a Random Access Memory (RAM), a processing unit, a host interface, a memory interface, and the error corrector.

The controller 3100 may communicate with an external device through the connector 3300. The controller 3100 may communicate with the external device (e.g., the host) according to a specific communication protocol. Exemplarily, the controller 3100 may communicate with the external device through at least one of various communication protocols, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 3300 may be defined by at least one of the above-described various communication protocols.

The memory device 3200 may include memory cells and may be configured identically to the memory device 100, shown in FIG. 1.

The controller 3100 and the memory device 3200 may be integrated into a single semiconductor device to constitute a memory card. For example, the controller 3100 and the memory device 3200 may constitute a memory card, such as a personal computer (PC) card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 10:
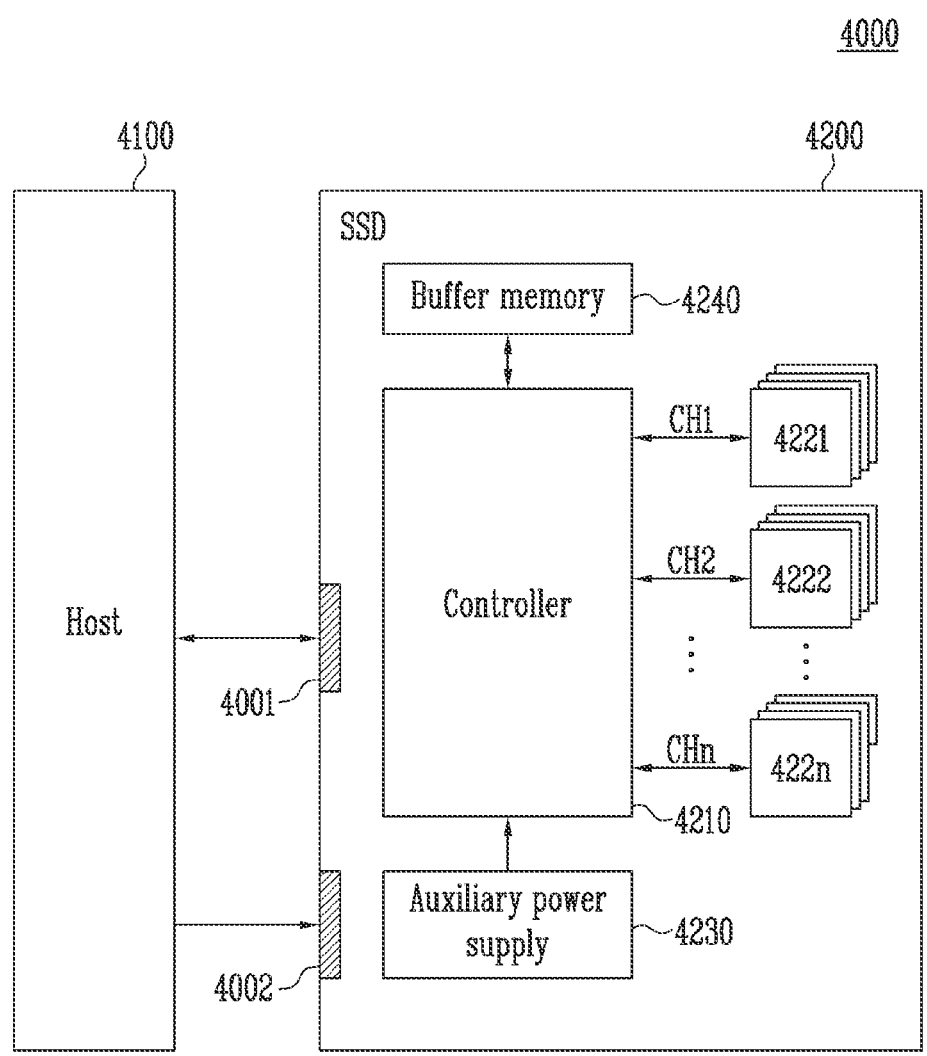
FIG. 10 is a diagram illustrating a Solid State Drive (SSD) system to which the memory device of the present disclosure is applied.

FIG. 10 is a diagram illustrating a Solid State Drive (SSD) system to which the memory device of the present disclosure is applied.

Referring to FIG. 10, the SSD system 4000 may include a host 4100 and an SSD 4200. The SSD 4200 may exchange a signal with the host 4100 through a signal connector 4001 and may receive power through a power connector 4002. The SSD 4200 may include a controller 4210, a plurality of memory devices 4221 to 422n, an auxiliary power supply 4230, and a buffer memory 4240.

The controller 4210 may control the plurality of memory devices 4221 to 422n in response to a signal received from the host 4100. Exemplarily, the signal may be a signal based on an interface between the host 4100 and the SSD 4200. For example, the signal may be a signal defined by at least one of the following interfaces: a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The plurality of memory devices 4221 to 422n may include a plurality of memory cells configured to store data. Each of the plurality of memory devices 4221 to 422n may be configured identically to the memory device 100, shown in FIG. 1. The plurality of memory devices 4221 to 422n may communicate with the controller 4210 through channels CH1 to CHn.

The auxiliary power supply 4230 may be connected to the host 4100 through the power connector 4002. The auxiliary power supply 4230 may receive power PWR input from the host 4100 and may charge the power PWR. When the supply of power from the host 4100 is not smooth, the auxiliary power supply 4230 may provide power for the SSD 4200. Exemplarily, the auxiliary power supply 4230 may be located in the SSD 4200 or may be located at the outside of the SSD 4200. For example, the auxiliary power supply 4230 may be located on a main board and may provide auxiliary power to the SSD 4200.

The buffer memory 4240 may operate as a buffer memory of the SSD 4200. For example, the buffer memory 4240 may temporarily store data received from the host 4100 or data received from the plurality of memory devices 4221 to 422n or may temporarily store meta data (e.g., a mapping table) of the memory devices 4221 to 422n. The buffer memory 4240 may include volatile memories, such as a DRAM, an SDRAM, a DDR SDRAM, an LPDDR SDRAM, and a GRAM or nonvolatile memories, such as a FRAM, a ReRAM, an STT-MRAM, and a PRAM.

In accordance with the present disclosure, the layout of support structures may be changed so that a defect that may occur in a manufacturing process of the memory device can be reduced. Accordingly, the yield of the manufacturing process of the memory device can be improved.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein.

What is claimed is:

1. A memory device comprising:
   a stack structure;
   first support structures penetrating the stack structure, the first support structures being spaced apart from each other in a first direction;
   a first protrusion pattern penetrating the stack structure, the first protrusion pattern being spaced apart from one of the first support structures in a second direction;
   a first outer support structure penetrating the stack structure, the first outer support structure extending along the first direction from the first protrusion pattern; and
   a central support structure penetrating the stack structure, the central support structure extending in the second direction in a region between the first support structures, the central support structure being in contact with the first outer support structure.

2. The memory device of claim 1, wherein the first protrusion pattern has a line shape extending in the first direction.

3. The memory device of claim 1, wherein the first outer support structure is in contact with the first protrusion pattern and has a line shape extending in the first direction.

4. The memory device of claim 1, wherein the first protrusion pattern and the first outer support structure are located between the central support structure and some of the first support structures.

5. The memory device of claim 1, wherein a width of the central support structure in the first direction is narrower than a distance between adjacent first support structures in the first direction.

6. The memory device of claim 1, wherein a width of the first protrusion pattern in the second direction is equal to a width of the first outer support structure in the second direction.

7. The memory device of claim 1, wherein a width of the first protrusion pattern in the second direction is narrower than a width of the first outer support structure in the second direction.

8. The memory device of claim 1, wherein a width of the first protrusion pattern in the second direction is wider than a width of the first outer support structure in the second direction.

9. The memory device of claim 1, further comprising a contact located between adjacent first support structures in the first direction.

10. The memory device of claim 9, wherein the contact is aligned with and spaced apart from the central support structure in the second direction.

11. The memory device of claim 9, wherein a portion of the first outer support structure is located between the contact and the central support structure.

12. The memory device of claim 1, wherein the central support structure is in vertical contact with the first outer support structure.

13. The memory device of claim 1, further comprising:
a second outer support structure parallel to the first outer support structure, the second outer support structure being in contact with the central support structure; and
a second protrusion pattern parallel to the first protrusion pattern, the second protrusion pattern protruding in the first direction from the second outer support structure.

14. The memory device of claim 13, wherein a length of the second protrusion pattern is equal to a length of the first protrusion pattern.

15. The memory device of claim 1, further comprising a third protrusion pattern parallel to the first protrusion pattern, the third protrusion pattern being in contact with the central support structure.

16. The memory device of claim 1, wherein a corner of the first protrusion pattern has a right-angled shape or a curved shape.

17. A memory device comprising:
a stack structure;
first and second outer support structures penetrating the stack structure, the first and second outer support structures extending in parallel to each other in a first direction;
a central support structure extending in a second direction, which is perpendicular to the first direction, between the first and second outer support structures; and
a protrusion pattern penetrating the stack structure, the protrusion pattern extending along the first direction from the central support structure,
wherein the protrusion pattern extends in the opposite direction of a direction in which the first and second outer support structures extend from the central support structure.

18. The memory device of claim 17, further comprising:
a first support structure spaced apart from the protrusion pattern along the second direction;
a second support structure spaced apart from the first support structure along the first direction, the second support structure being spaced apart from the first outer support structure along the second direction; and
a contact aligned with and spaced apart from the central support structure along the second direction.

19. The memory device of claim 18, wherein a region in contact with the central support structure in the first outer support structure is located between the contact and the central support structure.

20. The memory device of claim 18, wherein a distance between the contact and the first outer support structure is greater than a distance between the second support structure and the first outer support structure.

* * * * *